United States Patent
Adachi et al.

(10) Patent No.: US 9,945,267 B2
(45) Date of Patent: Apr. 17, 2018

(54) HEAT-COLLECTING-TYPE POWER GENERATION SYSTEM

(71) Applicant: Kobe Steel, Ltd., Hyogo (JP)

(72) Inventors: Shigeto Adachi, Takasago (JP); Yutaka Narukawa, Takasago (JP); Noboru Tsuboi, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 124 days.

(21) Appl. No.: 15/074,093

(22) Filed: Mar. 18, 2016

(65) Prior Publication Data

US 2016/0281542 A1    Sep. 29, 2016

(30) Foreign Application Priority Data

Mar. 23, 2015    (JP) ................................. 2015-059800

(51) Int. Cl.
*F01K 25/08* (2006.01)
*F01K 23/06* (2006.01)

(52) U.S. Cl.
CPC ............ *F01K 25/08* (2013.01); *F01K 23/065* (2013.01); *Y02E 20/12* (2013.01); *Y02E 20/14* (2013.01)

(58) Field of Classification Search
CPC ....... F01K 25/08; F01K 23/065; Y02E 20/14; Y02E 20/12

(Continued)

(56) References Cited

U.S. PATENT DOCUMENTS 3,744,245 A * 7/1973 Kelly ..................... F01K 7/00
                                                    60/519
3,747,333 A * 7/1973 Gerstmann ........... F01K 13/006
                                                    137/341

(Continued)

FOREIGN PATENT DOCUMENTS

| EP | 0787891 A2 | 8/1997 |
| JP | 09-088502 A | 3/1997 |
| WO | 2005/031123 A1 | 4/2005 |

OTHER PUBLICATIONS

The extended European search report issued by the European Patent Office dated Nov. 4, 2016, which corresponds to European Patent Application No. 16158057.6-1610 and is related to U.S. Appl. No. 15/074,093.

*Primary Examiner* — Hoang Nguyen
(74) *Attorney, Agent, or Firm* — Studebaker & Brackett PC

(57) ABSTRACT

Provided is a heat-collecting-type power generation system capable of maintaining a stable power generation efficiency even if supplied heat varies. The system includes an evaporator that heats and vaporizes a working medium; a displacement-type expander driven by the vaporized working medium; a power generator driven together with the expander; a condenser that cools and condenses the gas-phase working medium sent from the expander; and a circulation pump that draws the condensed liquid-phase working medium, raises pressure and transports the same to the evaporator, wherein the expander includes a plurality of expansion parts that expand the working medium stepwise, and internal volume ratios of the expansion parts are adjusted in a design phase, so that if at least one of a suction pressure and a discharge pressure of the expander varies, an overall thermal insulation efficiency is 70 percent or more, in a range of the variation.

9 Claims, 5 Drawing Sheets

(58) Field of Classification Search
USPC .......................................... 60/651, 671, 660
See application file for complete search history.

(56) References Cited

U.S. PATENT DOCUMENTS

| | | | | |
|---|---|---|---|---|
| 4,557,112 A | * | 12/1985 | Smith | ........................ F01K 7/00 60/651 |
| 5,027,602 A | * | 7/1991 | Glen | ........................ F01K 19/02 60/649 |
| 2008/0121755 A1 | * | 5/2008 | Bennett | ................ B64C 39/024 244/59 |
| 2010/0194111 A1 | * | 8/2010 | Van Den Bossche | .. F01K 3/247 290/2 |

* cited by examiner

| HEAT STATE | PRESSURE (MPa) | |
|---|---|---|
| | Ps | Pd |
| UPON HIGH-LEVEL HEAT SUPPLY | 2.0 | 0.16 |
| UPON LOW-LEVEL HEAT SUPPLY | 1.0 | 0.16 |

| HEAT STATE | PRESSURE (MPa) | | |
|---|---|---|---|
| | Ps | Pm | Pd |
| UPON HIGH-LEVEL HEAT SUPPLY | 2.0 | 5.6 | 0.16 |
| UPON LOW-LEVEL HEAT SUPPLY | 1.0 | 0.4 | 0.16 |

DISCHARGE OPENING, LARGE ⟵⎯⎯⟶ DISCHARGE OPENING, SMALL
(Vi, SMALL)　　　　　　　　　　(Vi, LARGE)

HEAT-COLLECTING-TYPE POWER GENERATION SYSTEM

BACKGROUND OF THE INVENTION (Field of the Invention)

The present invention relates to a heat-collecting-type power generation system.

(Description of the Related Art)

Conventionally, as a power generation system that generates power while collecting low-temperature waste heat, a binary power generation system is well known. This power generation system performs power generation in the following manner: a working medium having a low boiling point is caused to evaporate by utilizing waste heat, and with use of this gas-phase flow of the working medium, a displacement-type expander, for example, a screw type expansion turbine is rotated and driven, whereby a power generator is rotated together with the expander. Further, examples of a heat source from which heat is collected by such a power generation system include a variety of heat sources such as supercharged air to be supplied to a marine engine, waste heat of an engine, waste heat of a thermal power station, an incineration facility, and a factory, etc.

For such a power generation system, a task to be achieved is necessary to improve the power generation efficiency, so that the utility value of the system as a waste heat utilizing system should be improved. As an exemplary configuration that was developed to achieve the task, the configuration disclosed in JP9-88502A is known.

The configuration disclosed in JP9-88502A is as follows: the ratio of the effective screw length of a male rotor and a female rotor composing a screw type expansion turbine with respect to the outer diameter D, that is, L/D, is increased, and an inner end of a suction opening is opened toward an outer circumference surface in the vicinity of the high-pressure-side end of the male rotor and the female rotor.

The invention of JP9-88502A, having this configuration, is intended to reduce inflow loss of a working medium, thereby improve the efficiency, as compared with a conventional configuration in which the working medium flows into a working chamber via a nozzle hole having a limited area.

In such a conventional heat-collecting-type power generation system, however, the amount of heat supplied from a heat source easily varies, thereby there is a problem of an unstable power generation efficiency. Further, there is a problem that such stabilization of power generation efficiency cannot be achieved by the techniques disclosed in JP9-88502A.

The present invention was made in light of this as a background, and it is an object of the present invention to provide a heat-collecting-type power generation system that is capable of maintaining a stable power generation efficiency even if the amount of heat supplied from a heat source varies.

The heat-collecting-type power generation system according to the present invention includes: an evaporator that heats and vaporizes a working medium with heat of a heat source; a displacement-type expander that is driven by the working medium that has been vaporized by the evaporator, the working medium having a high pressure and being in a gas phase; a power generator that is driven in a state of being connected to the expander; a condenser that cools and condenses the working medium in a gas phase that has a low temperature and a low pressure, sent out of the expander; and a circulation pump that draws the working medium in a liquid phase that has been condensed by the condenser, raises the same in pressure, and transports the same to the evaporator, wherein the expander includes a plurality of expansion parts that expand the working medium stepwise, and internal volume ratios of the expansion parts are adjusted in a design phase, so that the expansion parts are configured in such a manner that, in a case where at least one of a suction pressure and a discharge pressure of the expander varies, an overall thermal insulation efficiency is 70 percent or more, in a range of the variation.

With the heat-collecting-type power generation system having such a configuration, since the expander includes a plurality of expansion parts that expand the gas-phase working medium stepwise, it is possible to improve the overall thermal insulation efficiency of the expander. Further, the expander has such a configuration that an overall thermal insulation efficiency is 70 percent or more, in the range of variation of the suction pressure or the discharge pressure, by adjusting the internal volume ratios of the expansion parts in the design phase. The heat-collecting-type power generation system of the present invention, therefore, is capable of maintaining a stable power generation efficiency even if the amount of heat of the heat source varies.

Further, preferably, in the expander, the internal volume ratios of the expansion parts are adjusted so as to be approximately identical to each other.

Here, "approximately identical" is intended to mean that if it can be determined in view of the common general knowledge that respective internal volume ratios of the expansion parts are intended to be identical, the internal volume ratios are considered identical even though there are some differences. With such a configuration, therefore, commonalization of a plurality of expansion parts can be achieved, whereby the design and manufacture are facilitated.

Further, preferably, in the expander, the internal volume ratios are adjusted by changing respective positions of the expansion phase ends in the expansion parts.

With such a configuration, the position of the expansion phase end in each expansion part can be changed by changing the shapes and sizes of the discharge openings, whereby the volumes at the end of the expansion phase can be easily adjusted. In this way, therefore, by changing the shapes and sizes of the discharge openings, the internal volume ratios can be adjusted easily.

Further, the expansion parts may be composed of two stages which are a high pressure side expansion unit and a low pressure side expansion unit.

With such a configuration, production costs of the power generation system can be reduced, while a high efficiency can be imparted thereto.

Further, the evaporator may be configured so as to be heated by supercharged air supplied from a supercharger to an engine.

With such a configuration, electric power to be used in a ship can be supplied by utilizing heat of the supercharged air supplied from the supercharger to the engine.

Further, preferably, the range of the variation of the suction pressure is a range of 1 MPa to 2 MPa both inclusive, and both of the internal volume ratios of the high pressure side expansion unit and the low pressure side expansion unit are 2.6±0.3.

With such a configuration, pressure variation that occurs in the case where heat of supercharged air supplied from the supercharger to the engine and heat of steam generated by the economizer are used can be covered. Further, in this case, the thermal insulation efficiency of the expander can be maintained at 73% upon low-level heat supply, and at 75% upon high-level heat supply. Thus, the amount of generated heat can be increased by 10%.

Further, preferably, each of the expansion parts is a screw type expansion turbine, and the expansion parts and the power generator are housed in one housing.

With such a configuration, windings of the power generator are cooled by using the working medium that is expanded in the expander thereby having decreased pressure and temperature, whereby the efficiency of the power generator can be maintained at a high level. Besides, a structure from which a working medium, a lubricant oil, or the like does not leak out can be achieved, which makes it possible to perform long-term stable operations.

The heat-collecting-type power generation system according to the present invention is capable of maintaining a stable power generation efficiency even if the amount of heat supplied from a heat source varies.

BRIEF DESCRIPTION OF THE DRAWINGS

FIG. 5A shows those in a case of one stage, and FIG. 5B shows those in a case of two stages.

DESCRIPTION OF THE PREFERRED EMBODIMENTS

A heat-collecting-type power generation system according to an embodiment is described below, with reference to the drawings. The present invention, however, is not limited by the examples described below; the scope of the present invention is indicated by the claims, and is intended to encompass meanings equivalent to the claims and all of changes within the scope of the claims.

Figure 1:
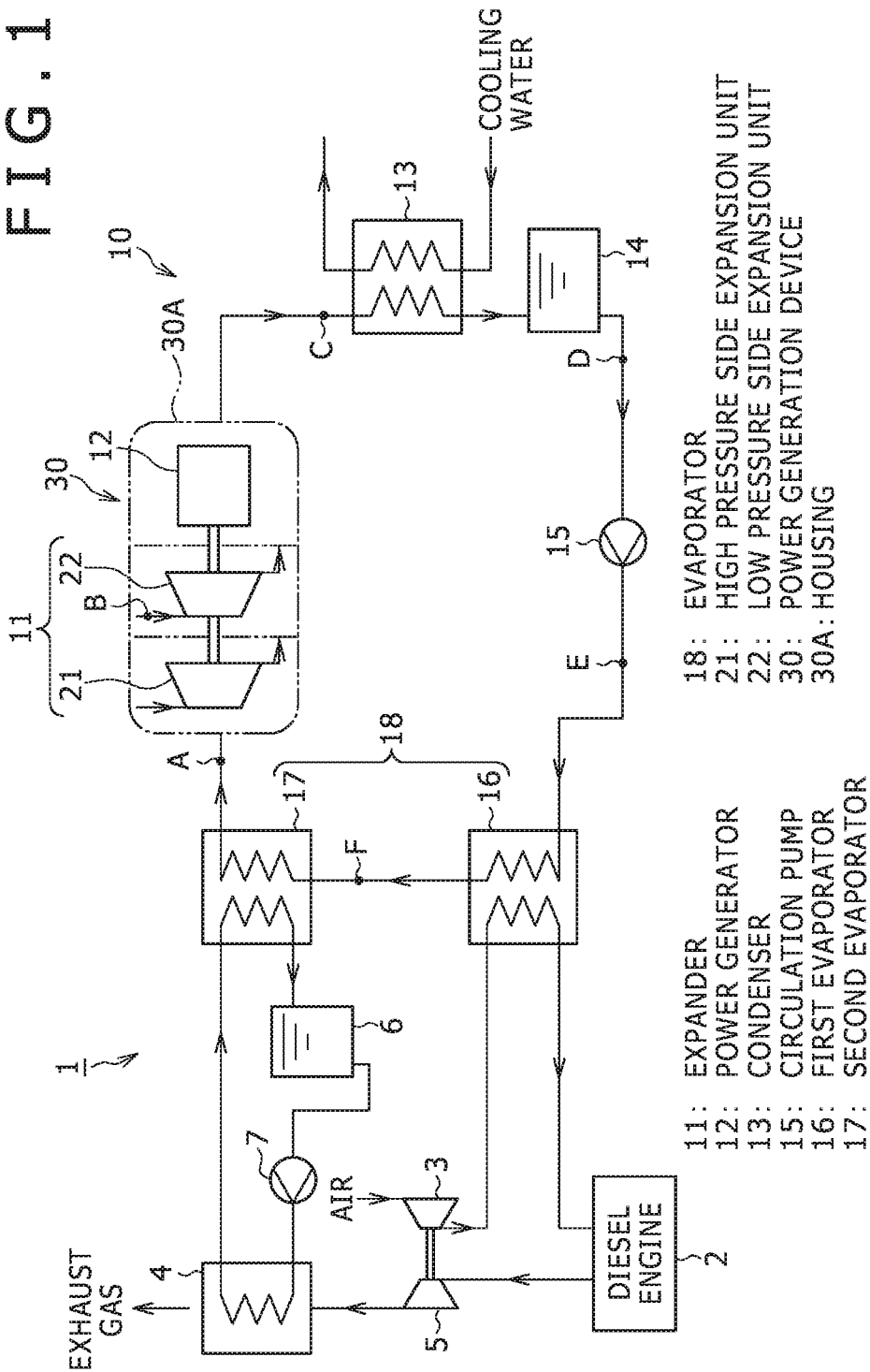
FIG. 1 is a pipe system diagram illustrating an overall configuration of a heat-collecting-type power generation system according to an embodiment of the present invention.

As illustrated in FIG. 1, a heat-collecting-type power generation system according to an embodiment is composed of a heat-source-side fluid circuit 1 for making waste heat utilizable, and a working medium circuit 10 that collects waste heat.

The heat-source-side fluid circuit 1 is intended to make waste heat of a ship propulsion diesel engine 2 utilizable. The heat-source-side fluid circuit 1 includes a supercharger 3 for compressing intake air to be supplied to the diesel engine 2, and includes an economizer 4 that generates steam using exhaust gas as a heat source.

The supercharger 3 is connected to a turbine 5 that is driven with exhaust gas of the diesel engine 2. Further, heat of the compressed air having been compressed by the supercharger 3 is supplied to a first evaporator 16 that composes an evaporator 18 of a working medium circuit 10, which is to be described below, so as to heat, in the first evaporator 16, a working medium that circulates through the working medium circuit 10. With this, the compressed air from the supercharger 3 is cooled in the first evaporator 16, and is supplied to the diesel engine 2.

Further, the economizer 4 is configured to use, as a heat source, the exhaust gas after passing through the turbine 5 driving the supercharger 3. The configuration is as follows: heat of steam generated in the economizer 4 is supplied to a second evaporator 17 that composes the evaporator 18 of the working medium circuit 10 that is to be described below, and heats the working medium that circulates the working medium circuit 10 in the second evaporator 17. Water that heats the working medium and is liquefied in the second evaporator 17 is stored in a reservoir 6, and is drawn by a pump 7, returned to the economizer 4. In the case where steam is supplied to a demander in the ship, which causes the water in the reservoir 6 to decrease, water is supplied from a hydrant (not shown).

The working medium circuit 10 forms an organic-rankine-cycle-type power generation device, that is, a so-called binary power generation device. The working medium circuit 10 is a closed circuit obtained by sequentially connecting an expander 11, a power generator 12, a condenser 13, a reservoir 14, a circulation pump 15, the first evaporator 16, and the second evaporator 17, the circuit being filled with a working medium. The first evaporator 16 and the second evaporator 17 compose the evaporator 18 in the working medium circuit 10.

As the working medium, an organic fluid having a boiling point lower than that of water is used. As the organic fluid, R245fa is used.

As the expander 11, a screw type expansion turbine is used, which is a displacement-type expander that sucks a gas-phase working medium heated by the evaporator 18 into an expansion chamber, and obtains torque corresponding to a change in the volume of the expansion chamber, with the pressure of the sucked working medium. Further, the expander 11 is configured to expand the high-pressure gas-phase working medium thus sucked at two stages, and includes a high pressure side expansion unit 21 and a low pressure side expansion unit 22, each of which is formed with a screw type expansion turbine. The displacement-type expander 11 is capable of efficiently converting, into a torque, a difference between pressures of the gas-phase working medium at the inlet port side and at the outlet port side. This makes it possible to efficiently obtain rotation power from the gas-phase working medium having a low pressure, as compared with the case where a conventional steam turbine-type expander is used.

The high pressure side expansion unit 21, the low pressure side expansion unit 22, and the power generator 12 are housed in one housing 30A in such a state of being coaxially fixed, so that power of the high pressure side expansion unit 21 and the low pressure side expansion unit 22, which compose the expander 11, is transmitted to the power generator 12 and causes electric power to be generated. More specifically, the high pressure side expansion unit 21, the low pressure side expansion unit 22, and the power generator 12 form a power generation device 30 having a uniaxially integrated, semi-enclosed structure.

A gas-phase working medium discharged from the expander 11 cools the power generator 12 inside the housing 30A of the power generation device 30, and thereafter, it is derived from the housing 30A of the power generation device 30.

The condenser 13 further cools the low-temperature gas-phase working medium derived from the power generation device 30 with use of the cooling water, so as to condense and liquefy the working medium. As the cooling water, seawater is used.

The reservoir 14 is a container that temporarily stores the working medium liquefied in the condenser 13. From this container, only the liquid-phase working medium is taken out.

The circulation pump 15 circulates the working medium through the inside of the working medium circuit 10. In this circuit, the circulation pump 15 operates to draw the liquid-state refrigerant out of the reservoir 14, raises the pressure thereof, and sends the same to the first evaporator 16, which composes the evaporator 18.

The evaporator 18 heats the liquid-phase working medium sent from the circulation pump 15 with heat of supercharged air of the supercharger 3, whereby the heat of the supercharged air is taken into the working medium circuit 10. The second evaporator 17 further heats the working medium, which having been heated in the first evaporator 16, by using the steam generated by the economizer 4 as a heat source, so that the heat of the steam is taken into the working medium circuit 10. In this way, the working medium heated in the evaporator 18 takes a gas phase, and is sent to the expander 11.

Figure 2:
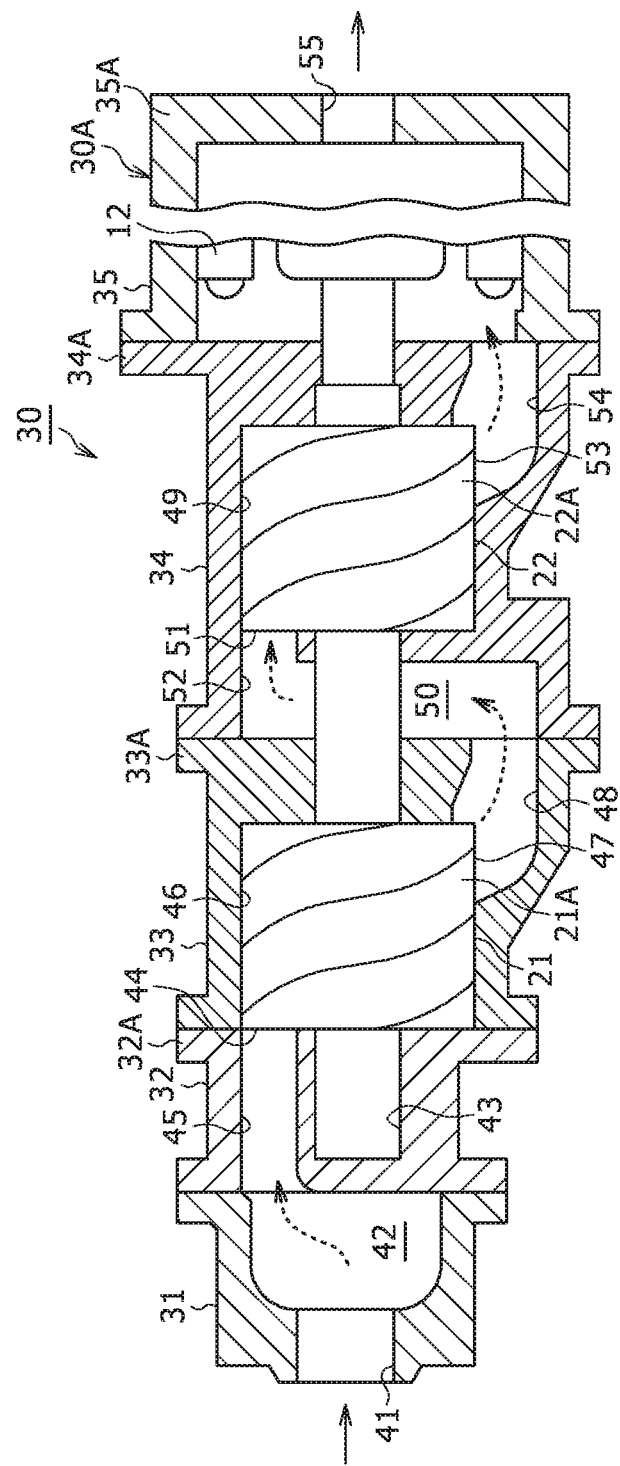
FIG. 2 is a cross-sectional view of a power generation device in the heat-collecting-type power generation system.

Next, the structure of the power generation device 30 is more specifically described, with reference to FIG. 2. In the following descriptions, the horizontal direction in FIG. 2 is assumed to be the horizontal direction of the power generation device 30, the vertical direction in FIG. 2 is assumed to be the vertical direction of the power generation device 30, the proximal side in FIG. 2 is assumed to be the front side of the power generation device 30, and the distal side in FIG. 2 is assumed to be the back side of the power generation device 30.

The housing 30A is divided into five parts so as to house the high pressure side expansion unit 21, the low pressure side expansion unit 22, and the power generator 12 in such a state that they are coaxially fixed. These divided housing parts are called a first housing 31, a second housing 32, a third housing 33, a fourth housing 34, and a fifth housing 35, respectively, in the stated order from the left side. Further, these five housing parts are connected with one another using fastening tools (not shown) such as bolts, thereby having a semi-enclosed structure.

The first housing 31 is a container having a right end thereof opened; at the center of a wall of a left end thereof, an introduction port 41 for introducing the gas-phase working medium into the inside is provided, and a space part 42 having a certain uniform volume for stabilizing the flow of fluid is formed in the inside.

The second housing 32 includes a rotor support member 43 of the screw type expansion turbine that forms the high pressure side expansion unit 21. The screw type expansion turbine forming the high pressure side expansion unit 21 is composed of a pair of male and female screw rotors 21A. The rotor support member 43 rotatably supports the screw rotors 21A. Further, in an upper part of the second housing 32, a first communication path 45 is formed that guides the gas-phase working fluid in the space part 42 of the first housing 31 toward a suction port 44 of the high pressure side expansion unit 21.

The third housing 33 is a container having a left end thereof opened, in which a first housing chamber 46 is formed that houses the screw rotors 21A of the screw type expansion turbine forming the high pressure side expansion unit 21. Further, the left end of the first housing chamber 46 is in contact with a wall body 32A of the second housing 32 so as to form a suction port 44 that guides the working medium to the expansion chamber of the high pressure side expansion unit 21. Further, on a wall body part of a lower part of the first housing chamber 46, a discharge opening 47 for discharging the gas-phase working medium, which has been expanded in the high pressure side expansion unit 21, is formed, and a second communication path 48 is also formed that guides the gas-phase working medium discharged from the discharge opening 47 into the fourth housing 34. Further, a wall body 33A at the right end forms a boundary wall between the third housing 33 and the fourth housing 34.

The fourth housing 34 is a container having a left end thereof opened, and in a center part thereof, a second housing chamber 49 is formed that houses a screw type expansion turbine forming the low pressure side expansion unit 22. The screw type expansion turbine forming the low pressure side expansion unit 22 is composed of a pair of male and female screw rotors 22A. Further, on the left side of the second housing chamber 49, a space part 50 having a left end thereof opened is formed, so that the gas-phase working medium from the second communication path 48 can be guided to this space part 50. In an upper part of the left end of the second housing chamber 49, a suction port 51 of the low pressure side expansion unit 22 is formed. The suction port 51 is intended to suck a gas-phase working medium into the expansion chamber of the low pressure side expansion unit 22. Further, a third communication path 52 extended in the horizontal direction is formed between the suction port 51 and the space part 50, so that the gas-phase working medium in the space part 50 is guided to the suction port 51. Further, on a wall body part in a lower part of the second housing chamber 49, a discharge opening 53 for discharging the gas-phase working medium, which has been expanded in the low pressure side expansion unit 22, is formed, and a fourth communication path 54 is also formed that guides the low temperature, low pressure gas-phase working medium discharged from the discharge opening 53 into the inside of the fifth housing 35. Further, a wall body 34A at the right end forms a boundary wall between the fourth housing 34 and the fifth housing 35.

The expansion turbine forming the high pressure side expansion unit 21 and the expansion turbine forming the low pressure side expansion unit 22 are of a commonly used type, and in each of these, a pair of male and female screw rotors 21A and 22A are arranged at positions with an identical height, so as to have rotation axes parallel with each other. In FIG. 2, the expansion turbine forming the high pressure side expansion unit 21 and the expansion turbine forming the low pressure side expansion unit 22 are arranged so that male screw rotors are visible on the proximal side. In the high pressure side expansion unit 21 and the low pressure side expansion unit 22, spaces surrounded by the blades of the screw rotors 21A, 22A and wall surfaces of the housing chambers 46, 49 function as expansion chambers, respectively. Further, each expansion chamber is formed so as to be gradually enlarged toward the discharge openings 47 and 53, respectively. This allows the working medium sucked into each of the housing chambers 46 and 49 to expand toward the discharge openings 47 and 53, respectively, whereby the screw rotors 21A and 22A rotate.

The fifth housing 35 is a container having a left end thereof opened, and in the inside thereof, the power generator 12 is housed. Further, in the center part of the wall body 35A at the right end, a lead-out port 55 is formed that derives the working medium after cooling the power generator 12 out to the outside of the power generation device 30.

The power generator 12 is directly connected to a rotation shaft of one of the male and female screw rotors. In the present embodiment, the power generator 12 is directly connected to the rotation shaft of the male screw rotor on the proximal side composing the low pressure side expansion unit 22. Further, the male screw rotor of the low pressure side expansion unit 22 and the male screw rotor on the proximal side composing the high pressure side expansion unit 21 are coaxially fixed. With this configuration, the rotation power of the expander 11 composed of the high pressure side expansion unit 21 and the low pressure side expansion unit 22 is transmitted to the power generator 12, and electric power can be obtained from the power generator 12. The electric power obtained by the power generator 12 is supplied to an inboard power system via electric power lines that are not shown in the drawings.

Incidentally, since the waste heat of the diesel engine 2 is utilized, the heat-collecting-type power generation system according to the present embodiment uses heat of supercharged air generated by using the heat of the exhaust gas of the diesel engine 2 as a main heat source, and uses heat of steam generated by the economizer 4 as an auxiliary heat source. The amount of heat of the supercharged air varies according to the magnitude and variation of the driving load on the diesel engine 2. Further, regarding the heat of steam, due to the amount of steam consumed in other demanders, the amount of heat that can be used varies together with the amount of the steam that can be used in the heat-collecting-type power generation system of the present embodiment. In the heat-collecting-type power generation system of the present embodiment, however, the expander 11 is designed so that even if the amount of heat of the heat source utilized varies, a stable power generation efficiency can be maintained.

Figure 3:
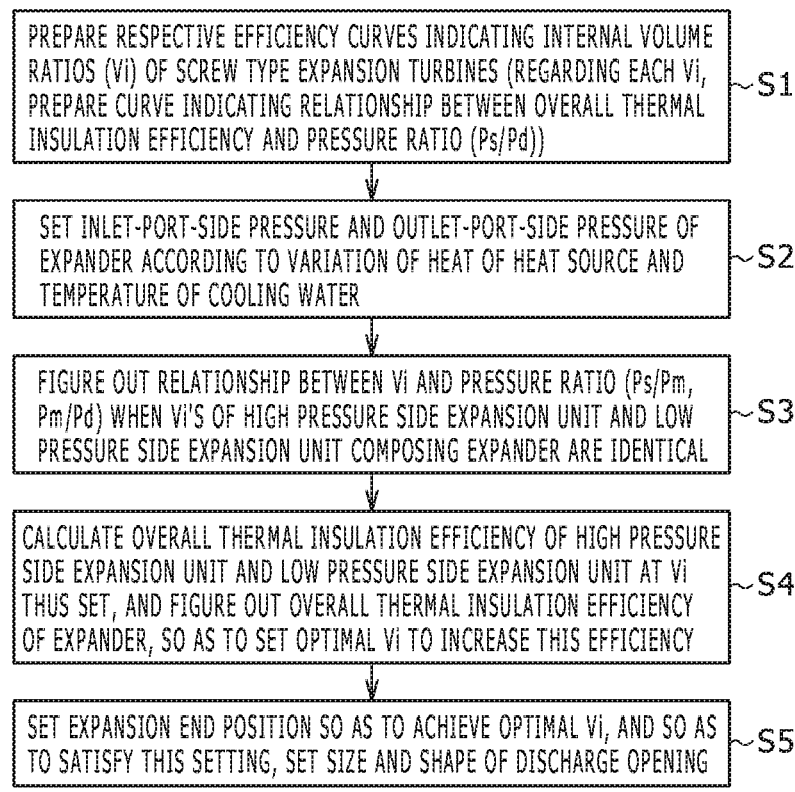
FIG. 3 is a design process flowchart of the heat-collecting-type power generation system.

Next, a design procedure for designing the expander 11 is described, with reference to FIG. 3.

The high pressure side expansion unit 21 and the low pressure side expansion unit 22, formed with screw type expansion turbines, in the expander 11 are configured in such a manner that commonalization of the screw rotors 21A and 22A can be achieved. First, as indicated in Step S1, respective efficiency curves of the screw type expansion turbines are prepared. These efficiency curves are curves in a characteristic diagram illustrating variation of the overall thermal insulation efficiency with respect to the pressure ratio Ps/Pd regarding every internal volume ratio Vi. Here, the internal volume ratio Vi refers to a ratio between the volume of the expansion chamber at the end of the suction phase and the volume of the expansion chamber at the end of the expansion phase. Further, the pressure ratio Ps/Pd refers to a ratio of a discharge pressure Pd of the expansion turbine with respect to a suction pressure Ps of the expansion turbine. The diagram is, for example, a diagram illustrated in FIG. 4.

Figure 5A:
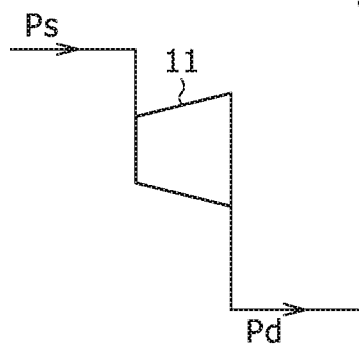
FIGS. 5A and 5B are explanatory views that explain pressure states of outlet and inlet ports of the expander of the heat-collecting-type power generation system.

Next, as indicated in Step S2, the suction pressure Ps and the discharge pressure Pd of the expander 11 are predicted and set from changes in the amount of heat of the heat source and the temperature of the cooling water. In the present embodiment, as illustrated in FIG. 5A, upon high-level heat supply, that is, when the amount of heat obtained by summing the amount of heat of the supercharged air and the amount of heat of steam becomes the maximum predicted value, the suction pressure Ps of the expander 11 becomes 2 MPa, and the discharge pressure Pd of the expander 11 becomes 0.16 MPa. The pressure ratio Ps/Pd, therefore, is predicted to be 2.0/0.16=12.5. The discharge pressure Pd of the expander 11 is determined depending on the flow amount of seawater as the cooling water, and the temperature thereof, but these values hardly vary in a ship. The discharge pressure Pd, therefore, is almost uniformly maintained.

On the other hand, upon low-level heat supply, that is, when the amount of heat obtained by summing the amount of heat of the supercharged air and the amount of heat of the steam becomes the minimum predictive value, the suction pressure Ps of the expander 11 becomes 1 MPa, and the discharge pressure Pd of the expander 11 becomes 0.16 MPa. The pressure ratio Ps/Pd, therefore, is predicted to be 1.0/0.16=6.26.

Figure 4:
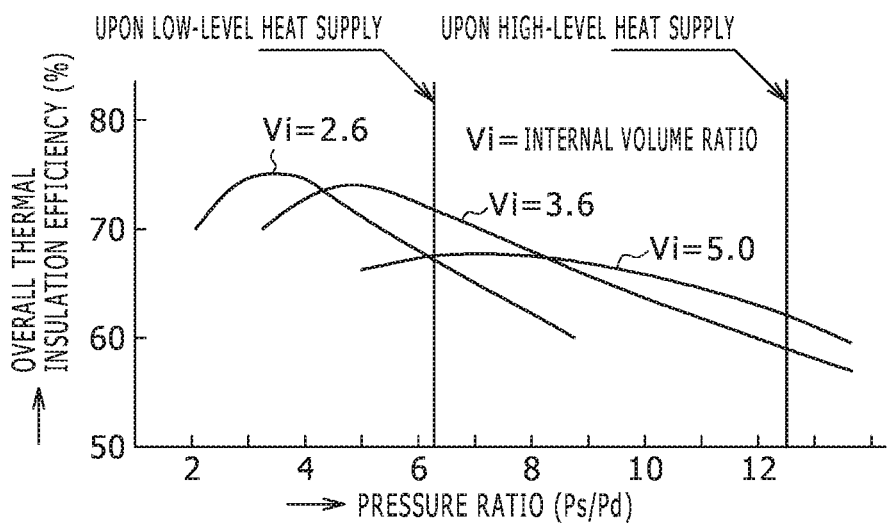
FIG. 4 is a chart showing the relationship among the pressure ratio, the internal volume ratio, and the overall thermal insulation efficiency of an expander, used in the designing of the heat-collecting-type power generation system.

The efficiency in a case where a one-stage screw type expansion turbine is used is examined based on FIG. 4. Then, it is found that, in a case where the internal volume ratio Vi is set to 2.6, the efficiency upon high-level heat supply (pressure ratio Ps/Pd=12.5) is 55%, actually, though not clearly shown in FIG. 4, and the efficiency upon low-level heat supply (pressure ratio Ps/Pd=6.26) is 67%. Further, in a case where the internal volume ratio Vi is set to 3.6, the efficiency upon high-level heat supply (pressure ratio Ps/Pd=12.5) is 59%, and the efficiency upon low-level heat supply (pressure ratio Ps/Pd=6.26) is 71%. Further, in a case where the internal volume ratio Vi is set to 5.0, the efficiency upon high-level heat supply (pressure ratio Ps/Pd=12.5) is 62%, and the efficiency upon low-level heat supply (pressure ratio Ps/Pd=6.26) is 67%. Therefore, in a case where the processing is performed by a one-stage screw type expansion turbine, in order that efficiencies at identical levels should be achieved upon high-level heat supply and upon low-level heat supply, the internal volume ratio Vi is preferably set to 5.0, but the efficiency becomes lower totally.

Then, the configuration is changed to a multistage expansion turbine in which the expander 11 is expanded stepwise so that the overall thermal insulation efficiency is improved. In this case, a technique of expanding the expander 11 in two stages of the high pressure side expansion unit 21 and the low pressure side expansion unit 22 is taken. Then, as indicated in Step S3 in FIG. 3, the relationship between the internal volume ratio Vi and the pressure ratio of each expansion part in a case where the internal volume ratio Vi of the high pressure side expansion unit 21 composing the expander 11 and the internal volume ratio Vi of the low pressure side expansion unit 22 composing the expander 11 are set to be identical is figured out. The reason why the internal volume ratio Vi of the high pressure side expansion unit 21 and the internal volume ratio Vi of the low pressure side expansion unit 22 are set to be identical is that the commonalization of the configuration of the high pressure side expansion unit 21 and the configuration of the low pressure side expansion unit 22 facilitates the design and manufacture of these.

Figure 5B:
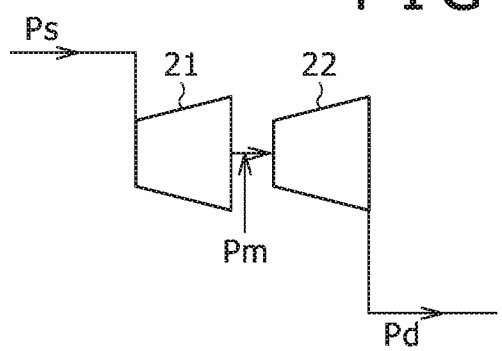

Further, more specifically, aiming at the increase of the overall thermal insulation efficiency, the internal volume ratio Vi is set to 2.6. By doing so, as illustrated in FIG. 5B, upon high-level heat supply, the pressure is decreased from the suction pressure Ps=2.0 to the intermediate pressure Pm=0.56 in the high pressure side expansion unit 21, and is decreased from the intermediate pressure Pm=0.56 to the discharge pressure Pd=0.16 in the low pressure side expansion unit 22. Further, upon low-level heat supply, the pressure is decreased from the suction pressure Ps=1.0 to the intermediate pressure Pm=0.4 in the high pressure side expansion unit 21, and is decreased from the intermediate pressure Pm=0.4 to the discharge pressure Pd=0.16 in the low pressure side expansion unit 22.

In a case where this is performed, regarding the pressure ratio upon high-level heat supply, the pressure ratio Ps/Pm in the high pressure side expansion unit 21 is 3.57, and the pressure ratio Pm/Pd in the low pressure side expansion unit 22 is 3.5, which are substantially identical to each other. Further, regarding the pressure ratio upon low-level heat supply, the pressure ratio Ps/Pm in the high pressure side expansion unit 21 is 2.5, and the pressure ratio Pm/Pd in the low pressure side expansion unit 22 is also 2.5, which are substantially identical to each other.

Next, as indicated by Step S4 in FIG. 3, the overall thermal insulation efficiencies of the high pressure side expansion unit 21 and the low pressure side expansion unit 22 at the set internal volume ratio Vi are calculated, and at the same time, the overall thermal insulation efficiency of the expander 11 is figured out, whereby an optimal internal volume ratio Vi with which a high overall thermal insulation efficiency can be achieved is determined.

Figure 6:
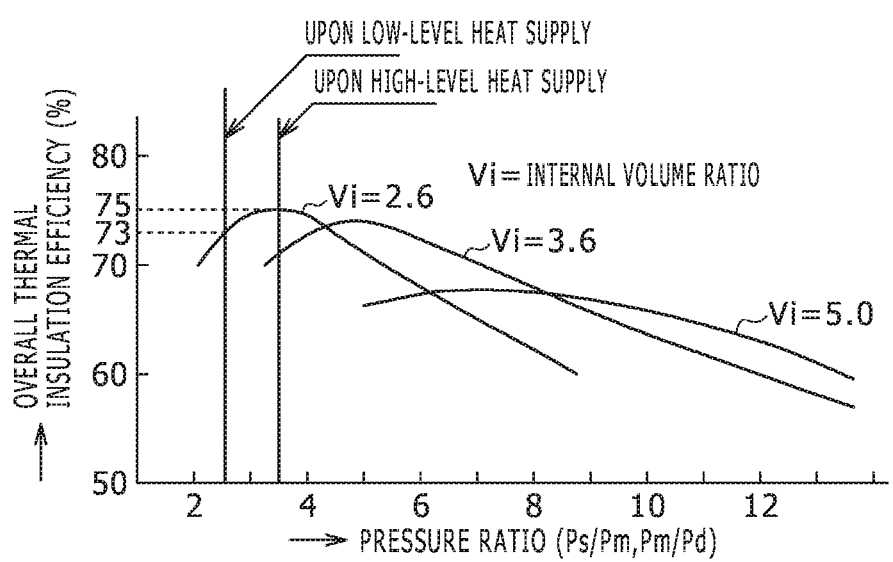
FIG. 6 is a chart showing set values of the pressure ratios, the internal volume ratios, and the overall thermal insulation efficiencies of the expander in the heat-collecting-type power generation system.

Then, based on FIG. 6, an overall thermal insulation efficiency in a case where the internal volume ratio Vi is set to 2.6 is examined. First of all, an overall thermal insulation efficiency upon high-level heat supply is examined: since the pressure ratio Ps/Pm in the high pressure side expansion unit 21 is 3.57 and the pressure ratio Pm/Pd in the low pressure side expansion unit 22 is 3.5, both of the overall thermal insulation efficiencies upon high-level heat supply in the high pressure side expansion unit 21 and in the low pressure side expansion unit 22 are 75%. Further, the overall thermal insulation efficiency upon low-level heat supply is examined: since both of the pressure ratio Ps/Pm in the high pressure side expansion unit 21 and the pressure ratio Pm/Pd in the low pressure side expansion unit 22 are 2.5, both of the overall thermal insulation efficiencies upon low-level heat supply in the high pressure side expansion unit 21 and in the low pressure side expansion unit 22 are 73%.

In this way, in a case where the internal volume ratio Vi is 2.6, the overall thermal insulation efficiency increases upon both of high-level heat supply and low-level heat supply, the overall thermal insulation efficiency of the expander as a whole increases to 73 to 75%, which proves that it is appropriate to set the internal volume ratio Vi to 2.6. Further, it was proved that doing this allows the amount of generated heat to increase by about 10%.

Next, how to adjust the internal volume ratio Vi in the displacement-type expander is described below. To adjust the internal volume ratio Vi in the displacement-type expander, the timing of the expansion phase end may be changed, whereby the internal volume ratio can be changed by changing the volume of the expansion chamber at the end of the expansion phase. Further, the timing of the expansion phase end can be changed by changing the size and shape of the discharge opening. After the optimal internal volume ratio Vi is set, therefore, as indicated in Step S5 in FIG. 3, the size and shape of the discharge opening are set so that the optimal internal volume ratio Vi (Vi=2.6 in the case of the present embodiment) is obtained.

Figure 7:
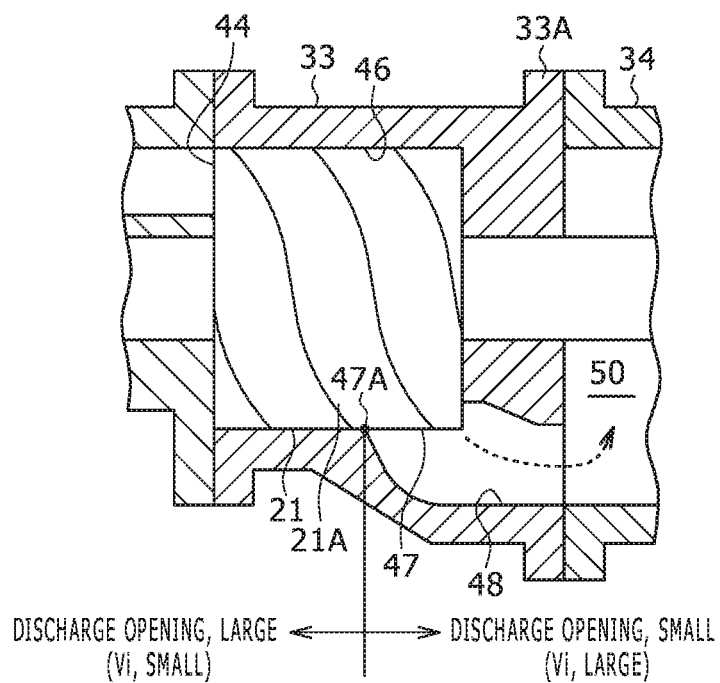
FIG. 7 is a partially enlarged cross-sectional view in the vicinities of a discharge opening of a screw type expansion turbine in the power generation device.

Here, the setting of the size and shape of the discharge opening in the case of the high pressure side expansion unit 21 in the present embodiment is described, based on FIG. 7. As described above, by changing the left end position 47A of the discharge opening 47 of the high pressure side expansion unit 21, which influences the timing of the expansion phase end, in the axis direction, the timing of the expansion phase end of the high pressure side expansion unit 21 can be changed, whereby the internal volume ratio Vi of the high pressure side expansion unit 21 can be changed. More specifically, when the left end position 47A of the discharge opening 47 is shifted rightward in FIG. 7, the discharge opening 47 becomes smaller, which delays the timing of the expansion phase end. This decreases the volume of the expansion chamber at the end of the expansion phase, thereby increasing the internal volume ratio Vi. By contraries, when the left end position 47A of the discharge opening 47 is shifted leftward, the discharge opening 47 becomes smaller, which brings the timing of the expansion phase end forward. This increases the volume of the expansion chamber at the timing of the expansion phase end, thereby decreasing the internal volume ratio Vi.

The foregoing description is made regarding the case where the setting of the internal volume ratio Vi of the high pressure side expansion unit 21 is changed; the changing of the setting of the internal volume ratio Vi of the low pressure side expansion unit 22 can be performed according to this as well. In this way, in the expander 11 in the present embodiment, the setting of the internal volume ratio Vi can be changed by changing the sizes and shapes of the discharge openings 47 and 53.

Next, operations of the heat-collecting-type power generation system according to the present embodiment are described. First of all, operations in the heat-source-side fluid circuit 1 are described.

In the heat-source-side fluid circuit 1, the turbine 5 is driven with exhaust gas at about 170° C. to 300° C. of the diesel engine 2, and the supercharger 3 connected to the turbine 5 is driven. The supercharged air from the supercharger 3 driven with the exhaust gas of the diesel engine 2 has a temperature of about 150° C. to 250° C., and is supplied via the first evaporator 16 of the working medium circuit 10 to the diesel engine 2. In this way, in the first evaporator 16, the supercharged air exchanges heat with the working medium circulating through the working medium circuit 10, whereby the heat of the supercharged air is imparted to the working medium circulating through the working medium circuit 10.

Further, the exhaust gas used for driving the supercharger 3 becomes air having a temperature of about 150° C. to 250° C. after passing through the turbine 5 and is supplied to the economizer 4. Then, the air is used for generating steam in the economizer 4, and is discharged thereafter. The steam generated in the economizer 4 is sent to other demanders such as a soot blow in the ship, but in a case where the amount of steam used in such other demanders is small, surplus steam is sent to the second evaporator 17 of the working medium circuit 10. In the second evaporator 17, the surplus steam exchanges heat with the working medium circulating through the working medium circuit 10, whereby the heat of the surplus steam is imparted to the working medium circulating through the working medium circuit 10. On the other hand, the surplus steam, heating the working medium circulating through the working medium circuit 10, is condensed to water, and after being stored in the reservoir 6, it is returned to the economizer 4 by the pump 7.

Figure 8:
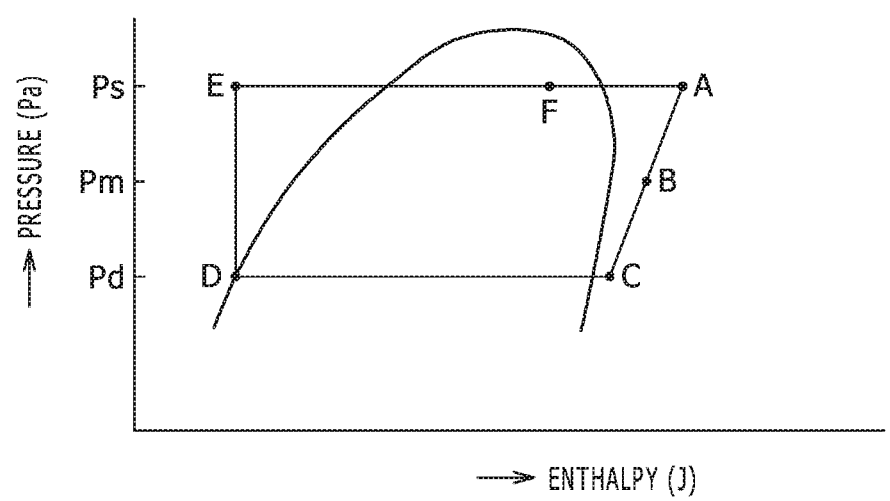
FIG. 8 is a p-h diagram (mollier diagram) of the heat-collecting-type power generation system.

Next, operations in the working medium circuit 10 are described with reference to the mollier diagram illustrated in FIG. 8. In the mollier diagram in FIG. 8, representative points that represent the states of the working medium are denoted by reference symbols A to F. Further, in FIG. 1 as well, which illustrates the configuration of the working medium circuit 10, positions corresponding to these points are denoted by the same reference symbols A to F, respectively, so that the correspondence relationship therebetween is illustrated intelligibly.

In the working medium circuit 10, a liquid-phase working medium of about 0.5 MPa to 2 MPa is heated and evaporate with the heat of the supercharged air in the first evaporator 16 (E→F). This allows heat of the supercharged air to be collected. Further, the liquid-gas mixed-phase working medium heated in the first evaporator 16 is further heated with heat of the surplus steam in the second evaporator 17 (F→A). This allows the heat of the surplus steam to be collected.

In this way, the gas-phase working medium heated by the evaporator 18 composed of the first evaporator 16 and the second evaporator 17 is introduced via the introduction port 41 into the power generation device 30, and flows in manners indicated by solid-line arrows and broken-line arrows in FIG. 2. The gas-phase working medium introduced into the power generation device 30 is adiabatically expanded in the high pressure side expansion unit 21 composed of a screw type expansion turbine (A→B), and subsequently, is further adiabatically expanded in the low pressure side expansion unit 22 composed of a screw type expansion turbine similarly (B→C). The pressure at the point B is about 0.5 MPa to 1.5 MPa, and the pressure at the point C is about 0.1 MPa to 0.5 MPa. Then, rotation power generated by these expansion turbines is transmitted to the power generator 12.

The working medium, having been expanded in the high pressure side expansion unit 21 and the low pressure side expansion unit 22, thereby becoming a low-temperature gas-phase fluid, cools the power generator 12, and is derived from the power generation device 30 via a lead-out port 55. This cooling effect achieved by the working medium makes it possible to stabilize the power generation efficiency of the power generator 12.

The gas-phase working medium derived from the power generation device 30 is cooled in the condenser 13 with seawater at about 20° C. to 40° C. as cooling water, thereby being condensed and liquefied (C→D). Then, the condensed and liquefied working medium is stored in the reservoir 14 temporarily. Only liquid-phase working medium is pumped out by a circulation pump and is raised in pressure (D→E), and is sent to the evaporator 18.

The working medium filled in the working medium circuit 10, forming the cycle as mentioned above, collects heat of the supercharged air and the heat of the surplus steam, so that power generation is performed. In this case, the high pressure side expansion unit 21 and the low pressure side expansion unit 22 composing the expander 11 are formed with screw type expansion turbines. Besides, as described above, the internal volume ratio Vi is determined to be 2.6 so that the overall thermal insulation efficiency is increased, and the shapes and sizes of the discharge openings 47 and 53 are set so that this internal volume ratio Vi is realized. As a result, even if the amount of heat of the supercharged air varies due to an increase/decrease in the load on the diesel engine 2, or if the utilizable amount of heat of the surplus steam varies due to variation of the amount of steam consumed by the other demanders, power generation is performed with a stable efficiency.

Effect

The heat-collecting-type power generation system according to the present embodiment, having the above-described configuration, has the effects as described below.

(1) According to the heat-collecting-type power generation system of the present invention, the expander 11 includes a plurality of expansion parts for expanding a working medium stepwise. This enables to improve the overall thermal insulation efficiency of the expander 11.

(2) Further, the expander 11 has such a configuration that by adjusting the internal volume ratio Vi of the expansion part of each stage in the design phase, an overall thermal insulation efficiency of 70 percent or more is achieved in the variation range of the suction pressure Ps. The heat-collecting-type power generation system of the present invention, therefore, is capable of maintaining a stable power generation efficiency, even if the amount of heat of a heat source varies.

(3) Further, in the heat-collecting-type power generation system of the present invention, the expander 11 has a two-stage configuration composed of the high pressure side expansion unit 21 and the low pressure side expansion unit 22. The system, therefore, can be a power generation system with reduced production costs and a high efficiency.

(4) Further, in the expander 11, internal volume ratios Vi of the expansion parts are adjusted so as to be identical to each other, which makes it possible to commonalize the expansion parts. The design and manufacture of each expansion part is facilitated therefore.

(5) Further, since the expander 11 uses displacement-type expansion turbines, the internal volume ratios can be adjusted easily by changing the positions of the expansion phase ends. In a case of the screw type expansion turbines as in the present embodiment, the position of the expansion phase end in each expansion part can be changed by changing the shapes and sizes of the discharge openings 47 and 53, whereby the volumes at the timing of the expansion phase end can be easily adjusted.

(6) Further, in the heat-collecting-type power generation system according to the present embodiment, the heat of supercharged air supplied from the supercharger 3 to the diesel engine 2 for ship and heat of the steam generated by the economizer 4 are collected, so that power generation is performed. This enables to supply electric power to be used in a ship.

(7) Further, in the heat-collecting-type power generation system according to the present embodiment, the amount of heat of the supercharger 3 varies with the load on the diesel engine 2, and at the same time, the amount of heat of the steam subjected to heat collection varies due to variation of the amount of the steam generated by the economizer 4 consumed by demander in a ship. Since the variation range of the suction pressure Ps is predicted to be a range of 1 MPa to 2 MPa, both inclusive, therefore, both of the internal volume ratios of the high pressure side expansion unit 21 and the low pressure side expansion unit 22 are preferably about 2.6±0.3. With such a configuration, pressure variation that occurs in the case where supercharged air supplied from the supercharger 3 to the diesel engine 2 and steam generated by the economizer 4 are used can be covered. Further, in this case, the thermal insulation efficiency of the expander 11 can be maintained at 73% upon low-level heat supply, and at 75% upon high-level heat supply. Consequently, the amount of generated heat can be increased by 10%.

(8) Further, according to the heat-collecting-type power generation system according to the present embodiment, each of the expansion parts is a screw type expansion turbine, and the expansion parts and the power generator 12 are housed in one housing 30A. Therefore, using the gas-phase working medium that is expanded in the expander 11 thereby having decreased pressure and temperature, windings of the power generator 12 can be cooled. With this configuration, the efficiency of the power generator 12 can be maintained at a high level.

(9) Further, according to the heat-collecting-type power generation system according to the present embodiment, the expansion parts and the power generator 12 are formed in a uniaxially integrated structure, and are housed in one housing 30A; that is, they are formed in a semi-enclosed structure. Thus, a structure from which a working medium, a lubricant oil, or the like does not leak out can be achieved, which makes it possible to perform long-term stable operations.

Modification Example

The above descriptions relating to the embodiment merely describe an example of an embodiment that the heat-collecting-type power generation system according to the present invention can take, and the descriptions are not intended to limit the embodiment. The heat-collecting-type power generation system according to the present invention can be embodied in, for example, modification examples of the above-described embodiment, which are described below, and a combination of at least two modification examples that do not mutually conflict.

In the above-described embodiment, in the design procedure, first of all, an efficiency curve indicating the relationship between the overall thermal insulation efficiency and the pressure ratio Ps/Pd regarding each internal volume ratio Vi is prepared (Step S1 in FIG. 3), and next, the suction pressure Ps and the discharge pressure Pd of the expander 11 are predicted and set according to changes in the amount of heat of the supercharged air as a heat source and the temperature of the cooling water (Step S2 in FIG. 3). This process, however, may be performed in a reverse order.

In the above-described embodiment, an expander composed of screw type expansion turbines is used as the expander 11, but the configuration is not limited to this. Another displacement-type expander such as a scroll-type expander can be used.

In the above-described embodiment, the expander 11 has a configuration of performing two-stage expansion, but the configuration is not limited to this. The number of stages of the expander 11 may be three or more, in view of the production costs. By increasing the number of stages, the overall thermal insulation efficiency can be improved further.

The target value of the internal volume ratio Vi of each expansion part is not necessarily 2.6, as long as the overall thermal insulation efficiency is 70% or more, in a range of the variation of the suction pressure and the discharge pressure; the value may be 2.6 or more and 3.6 or less. Further, it is necessary to appropriately set the internal volume ratio Vi according to the number of the stages, and it is preferable that the internal volume ratios Vi are identical in order to facilitate the design and manufacture of each expansion part. In a case where the number of the steps of the design and manufacture is in a tolerable range, however, respective internal volume ratios Vi of the expansion parts may be different from each other, in the range of 2.6 to 3.6 both inclusive.

Further, in the above-described embodiment, the cycle is a cycle of a multistage expansion type that the expansion is simply performed in two stages, but the cycle is not limited to this; the cycle may be a multistage regeneration cycle, or a multistage reheat cycle.

As the design technique in the above-described embodiment, a design technique for utilizing waste heat of a ship propulsion diesel engine is described, but the design technique may be such that waste heat of another engine, or waste heat of a thermal power station, an incineration facility, a factory, or the like is collected. More specifically, heat of water vapor discharged from a factory may be used as a heat source, or alternatively, steam other than water vapor, hot water, or the like may be used as a heat source, and such a design technique is effective in a case where the amount of heat of a heat source varies.

Further, in the present embodiment, the second evaporator 17 is formed in such a manner as to auxiliarily utilize heat of steam generated by the economizer 4, but the configuration thereof is not limited to this. For example, such a second evaporator utilizing the auxiliary heat source may be omitted. Further, the configuration may be such that exhaust gas of the diesel engine 2 is used as heat source of the second evaporator 17, and the working medium directly exchanges heat with the exhaust gas of the diesel engine 2.

In the present embodiment, a configuration in which cooling water the flow amount of which and the temperature of which hardly vary is used in a ship, since the cooling water used for the condenser 13 is seawater, but the configuration may be such that different cooling sources are used depending on utilized waste heat, regarding differences of the environments where they are used. Besides, the cooling source may be a cooling source whose cool performance varies with the season or the time, and in such a case, the pressure on the suction side may be designed according to the variation range thereof.

In the above-described embodiment, R245fa is used as the working medium to be filled in the working medium circuit 10, but in place of this, low-molecular-weight hydrocarbon such as isopentane, butane, or propane, or alternatively, R134a used as a refrigerant or the like may be used.

What is claimed is:

1. A heat-collecting-type power generation system comprising:
   an evaporator that heats and vaporizes a working medium with heat of a heat source;
   a displacement-type expander that is driven by the working medium that has been vaporized by the evaporator, the working medium having a high pressure and being in a gas phase, the expander draws the working medium at a suction pressure and a discharges the working medium at a discharge pressure;
   a power generator that is driven in a state of being connected to the expander;
   a condenser that cools and condenses the working medium in a gas phase that has a low temperature and a low pressure, sent out of the expander; and
   a circulation pump that draws the working medium in a liquid phase that has been condensed by the condenser, raises the same in pressure, and transports the same to the evaporator,
   wherein the expander includes a plurality of expansion parts that expand the working medium stepwise, each of the expansion parts has an expansion chamber to perform a suction phase and an expansion phase, and the expansion parts are configured such that internal volume ratios of the expansion parts are set so that an overall thermal insulation efficiency of the expander is 70 percent or more, within a range of the variation of a pressure ratio
where
the internal volume ratio is defined as a ratio between the volume of the expansion chamber of the expansion part at the end of the suction phase and the volume of the expansion chamber of the expansion part at the end of the expansion phase; and
the pressure ratio is defined as a ratio of the suction pressure of the expander with respect to the discharge pressure of the expander.

2. The heat-collecting-type power generation system according to claim 1,
wherein in the expander, the internal volume ratios of the expansion parts are adjusted so as to be approximately identical to each other.

3. The heat-collecting-type power generation system according to claim 1,
wherein in the expander, the internal volume ratios are adjusted by changing respective positions of expansion phase ends in the expansion parts.

4. The heat-collecting-type power generation system according to claim 1,
wherein the expansion parts are composed of two stages which are a high pressure side expansion unit and a low pressure side expansion unit.

5. The heat-collecting-type power generation system according to claim 4,
wherein the evaporator is configured so as to be heated by supercharged air supplied from a supercharger to an engine.

6. The heat-collecting-type power generation system according to claim 5,
wherein the range of the variation of the suction pressure is a range of 1 MPa to 2 MPa both inclusive, and
both of the internal volume ratios of the high pressure side expansion unit and the low pressure side expansion unit are 2.6±0.3.

7. The heat-collecting-type power generation system according to claim 1,
wherein each of the expansion parts is a screw type expansion turbine, and
the expansion parts and the power generator are housed in one housing.

8. The heat-collecting-type power generation system according to claim 1, wherein the expansion parts and the power generator are housed in one housing in such a state of being coaxially arranged so that power of the expansion parts are transmitted to the power generator to generate electric power and a gas-phase working medium discharged from the expansion parts cools the power generator inside of the housing.

9. The heat-collecting-type power generation system according to claim 1, wherein the evaporator includes a first evaporator and a second evaporator that are connected in series where the heat source comprises a supercharger for compressing intake air to be supplied to a diesel engine and an economizer for generating steam using exhaust gas of the diesel engine and the first evaporator heats the working-medium sent from the circulation pump with heat of supercharged air of the super charger and the second evaporator further heats the working-medium having been heated in the first evaporator by using the steam generated by the economizer.

* * * * *